(12) United States Patent
Nguyen et al.

(10) Patent No.: US 9,506,829 B2
(45) Date of Patent: Nov. 29, 2016

(54) PRESSURE SENSORS HAVING LOW COST, SMALL, UNIVERSAL PACKAGING

(71) Applicant: DunAn Sensing LLC, San Jose, CA (US)

(72) Inventors: Tom T. Nguyen, San Jose, CA (US); Cuong D. Nguyen, San Jose, CA (US)

(73) Assignee: DUNAN SENSING LLC, San Jose, CA (US)

( * ) Notice: Subject to any disclaimer, the term of this patent is extended or adjusted under 35 U.S.C. 154(b) by 122 days.

(21) Appl. No.: 14/310,881

(22) Filed: Jun. 20, 2014

(65) Prior Publication Data

US 2015/0369684 A1   Dec. 24, 2015

(51) Int. Cl.
   *G01L 19/14*   (2006.01)
   *G01L 19/00*   (2006.01)

(52) U.S. Cl.
   CPC ......... *G01L 19/0084* (2013.01); *G01L 19/142* (2013.01)

(58) Field of Classification Search
   CPC . G01L 19/14; G01L 19/142; G01L 19/0084; G01L 19/00
   See application file for complete search history.

(56) References Cited

U.S. PATENT DOCUMENTS

| | | | |
|---|---|---|---|
| 8,297,127 B2 | 10/2012 | Wade et al. | |
| 2013/0056100 A1* | 3/2013 | Imaizumi | B60T 13/662 137/560 |
| 2015/0346045 A1* | 12/2015 | Habibi | G01L 9/0052 73/754 |

* cited by examiner

*Primary Examiner* — Nguyen Ha
(74) *Attorney, Agent, or Firm* — Hackler Daghighian Martino & Novak

(57) ABSTRACT

Pressure sensor package that includes: a pressure sensor support attached to an interconnect housing which is attached to a compensation support; wherein: (a) a pressure sensor device is attached to the pressure sensor support and is electrically connected to pads disposed on the pressure sensor support; (b) compensation circuitry is attached to the compensation support and is electrically connected to pads disposed on the compensation support; (c) connectors disposed in through holes in a wall of the interconnect housing are electrically connected to the pads on the pressure sensor support and to the pads on the compensation support; and (d) a pressure port is disposed in the pressure sensor support.

20 Claims, 16 Drawing Sheets

US 9,506,829 B2

PRESSURE SENSORS HAVING LOW COST, SMALL, UNIVERSAL PACKAGING

TECHNICAL FIELD

One or more embodiments relate to pressure sensors and, in particular, to pressure sensors that sense a pressure of a medium such as a gas or a liquid, and in further particular, to pressure sensors having low cost, small, universal packaging that can be manufactured in high volume.

BACKGROUND

Pressure sensors are used in a wide variety of applications including, for example, in automotive, aerospace, industrial and medical applications. In many of such applications, pressure sensors detect a pressure via a sensing element, often formed on a pressure sensing die, which converts mechanical stress caused by an incoming pressure into an electrical output signal. In one or more of these applications, it may be desirable to reduce the cost and size of the pressure sensor packaging as much as possible.

SUMMARY

One or more embodiments relate generally to pressure sensors. In one illustrative embodiment, a pressure sensor package (also referred to herein as a "pressure sensor button") comprises: a pressure sensor support attached to an interconnect housing which is attached to a compensation support; wherein: (a) a pressure sensor device is attached to the pressure sensor support and is electrically connected to pads disposed on the pressure sensor support; (b) compensation circuitry is attached to the compensation support and is electrically connected to pads disposed on the compensation support; (c) connectors disposed in through holes in a wall of the interconnect housing are electrically connected to the pads on the pressure sensor support and to the pads on the compensation support; and (d) a pressure port is disposed in the pressure sensor support.

In accordance with one or more embodiments, the width of a pressure sensor button may be: (a) 10 mm or less; or (b) 15 mm, 19 mm, and so forth to provide a universal form factor for industry standard pressure sensor packages. Further, the height of a pressure sensor button may be less than about 6.35 mm.

DETAILED DESCRIPTION

Figure 1A:
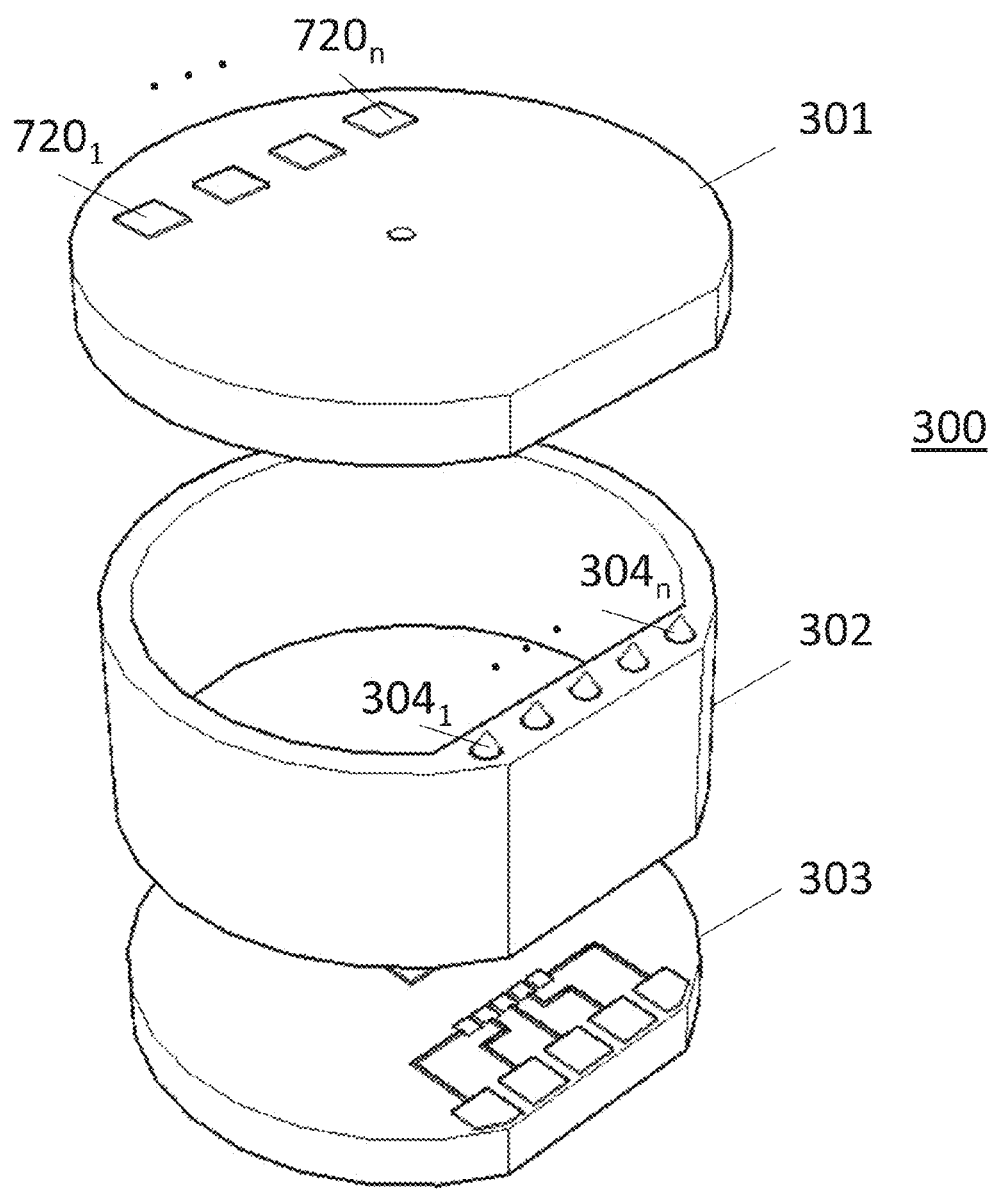
FIG. 1A is an exploded, perspective, top view of a pressure sensor package (pre-assembly) that is fabricated in accordance with one or more embodiments wherein pogo pins disposed in an interconnect housing provide electrical connections between a UPSD ("Universal Pressure Sensing Disc") and a CCD ("Customer-Specific Compensation Disc")

FIG. 1A is an exploded, perspective, top view of pressure sensor package 300 (also referred to as "pressure sensor button" 300) (pre-assembly) that is fabricated in accordance with one or more embodiments. As shown in FIG. 1A, pressure sensor button 300 comprises CCD 301 ("Customer-Specific Compensation Disc" 301); interconnect housing 302; and UPSD 303 ("Universal Pressure Sensing Disc" 303). As further shown in FIG. 1, pressure sensor button 300 further comprises pogo pins $304_1$-$304_n$ (pogo pins $304_1$-$304_n$ are disposed in interconnect housing 302) to provide electrical connections between UPSD 303 and CCD 301. In accordance with one or more embodiments, the width of pressure sensor button 300 may be: (a) 10 mm or less; or (b) 15 mm, 19 mm, and so forth, to provide a universal form factor for industry standard pressure sensor packages. Further, the height of pressure sensor button 300 may be less than about 6.35 mm. To assemble pressure sensor package 300, CCD 301, interconnect housing 302 and UPSD 303 are pressed together and secured to each other (as further described below). In accordance with one or more such embodiments using spring-loaded pogo pins, the electrical connections provided by the pogo pins are made during the assembly process as the parts are pressed together.

Figure 1B:
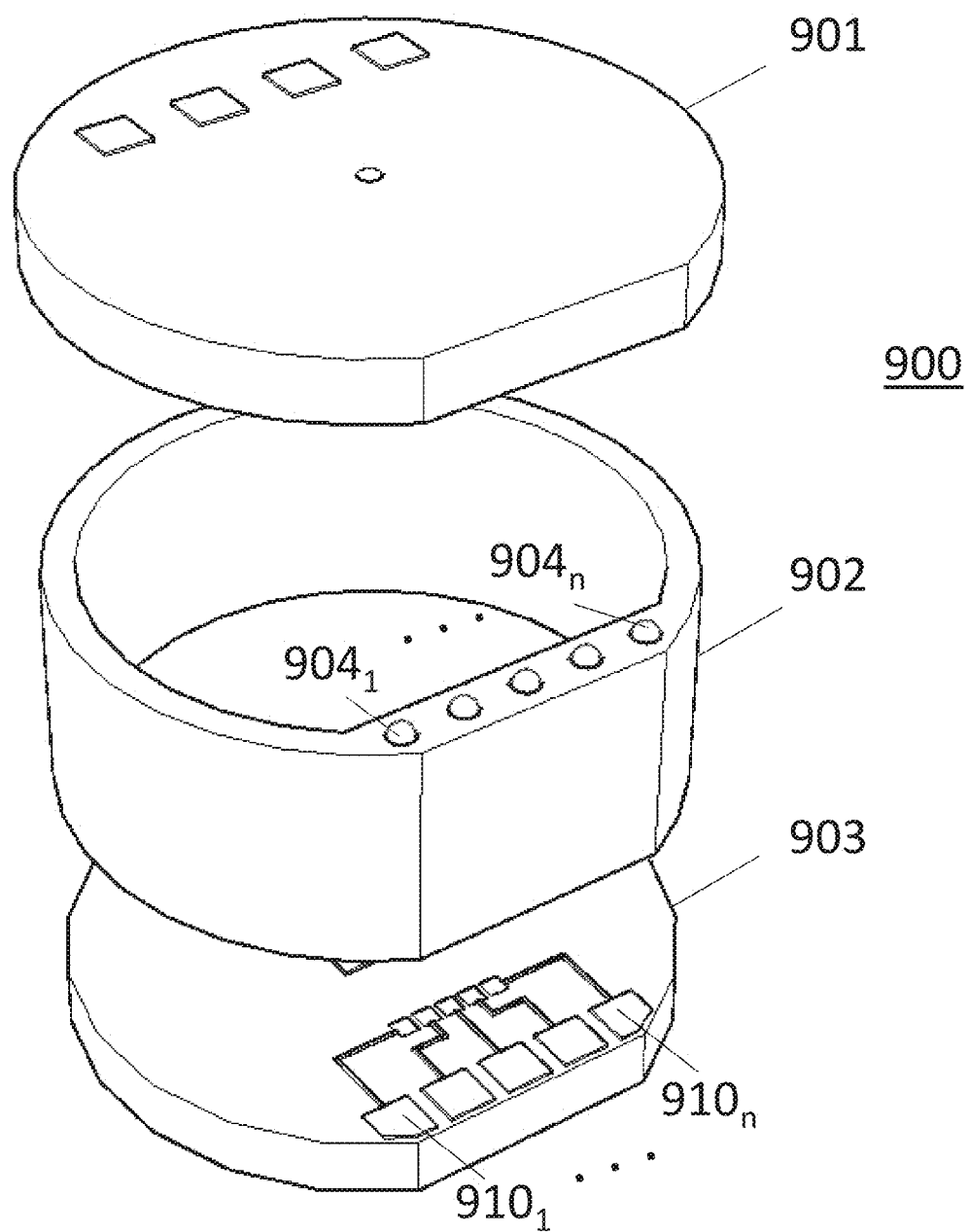
FIG. 1B is an exploded, perspective, top view of a pressure sensor package (pre-assembly) that is fabricated in accordance with one or more embodiments wherein solder bumps are disposed so that after assembly electrical connections are made between a UPSD, an interconnect housing and a CCD.

FIG. 1B is an exploded, perspective, top view of pressure sensor package 900 (also referred to as "pressure sensor button" 900) (pre-assembly) that is fabricated in accordance with one or more embodiments. As shown in FIG. 1B, pressure sensor button 900 comprises CCD 901; interconnect housing 902; and UPSD 903. As further shown in FIG. 1B and FIG. 9A, pressure sensor button 900 further comprises solder bumps $904_1$-$904_n$ and $974_1$-$974_n$ capping, for example and without limitation, solder paste disposed in through-holes in interconnect housing 902. Solder bumps $904_1$-$904_n$ and $974_1$-$974_n$ are disposed so that, after assembly, electrical connections are made from interconnect pads $910_1$-$910_n$ on UPSD 903, through interconnect housing 902, to interconnect pads (not shown in FIG. 1B) disposed on CCD 901. In accordance with one or more embodiments, the width of pressure sensor button 900 may be: (a) 10 mm or less; or (b) 15 mm, 19 mm, and so forth, to provide a universal form factor for industry standard pressure sensor packages. Further, the height of pressure sensor button 900 may be less than about 6.35 mm. To assemble pressure sensor button 900: (a) CCD 901, interconnect housing 902 and UPSD 903 are pressed together and secured to each other (as further described below); and (b) the button is placed in a reflow oven to heat up the parts to a solderable temperature (typically between about 220 and 320 degrees C.), which temperature depends on the content of the solder bumps.

Figure 2:
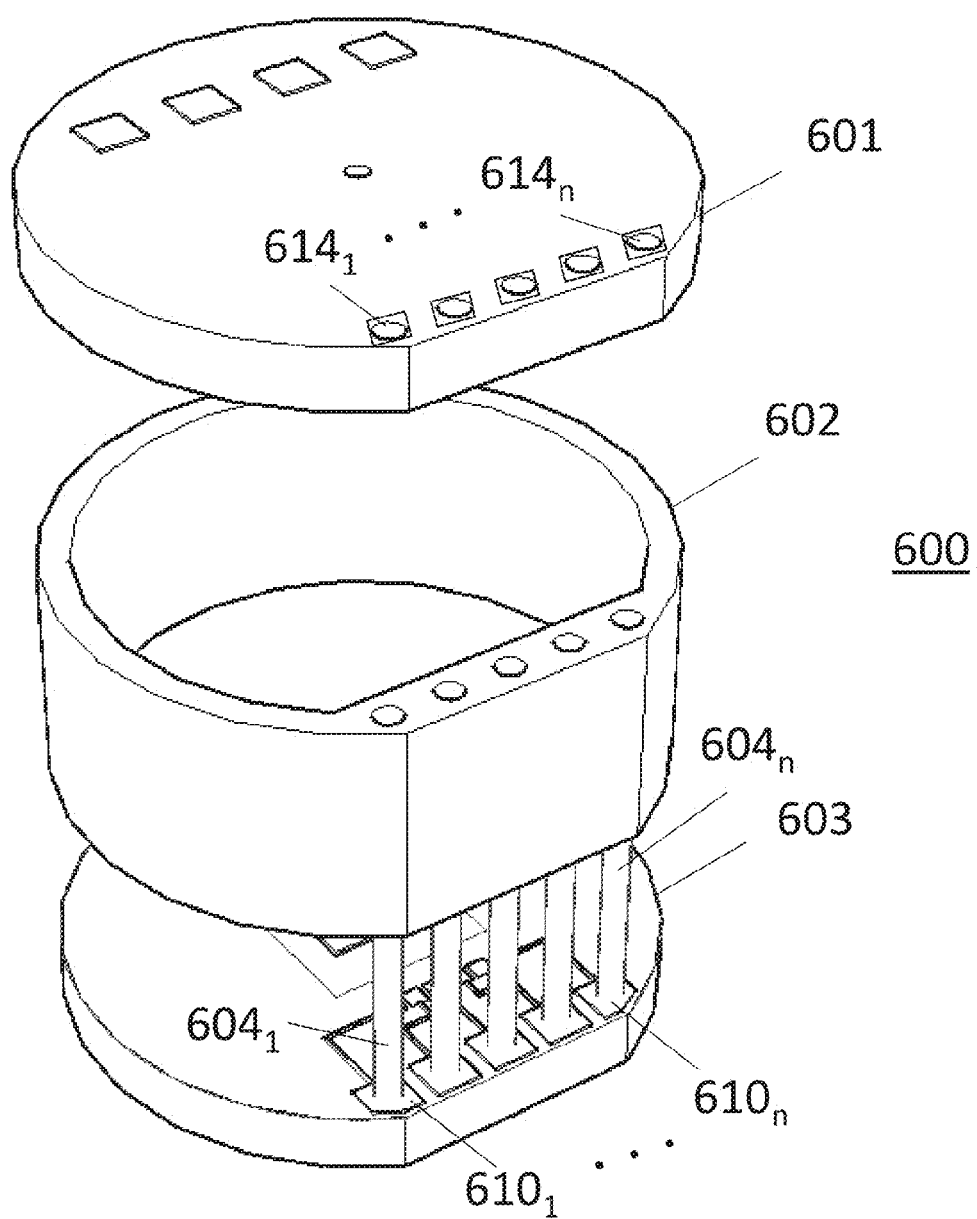
FIG. 2 is an exploded, perspective, top view of a pressure sensor package (pre-assembly) that is fabricated in accordance with one or more embodiments wherein solder pins provide electrical connections between a UPSD, an interconnect housing and a CCD.

FIG. 2 is an exploded, perspective, top view of pressure sensor package 600 (also referred to as "pressure sensor button" 600) (pre-assembly) that is fabricated in accordance with one or more embodiments. As shown in FIG. 2, pressure sensor button 600 comprises CCD 601; interconnect housing 602; and UPSD 603. As further shown in FIG. 2, pressure sensor button 600 further comprises solder pins $604_1$-$604_n$ disposed to make electrical connections from solder pads $610_1$-$610_n$ (also referred to as interconnect pads $610_1$-$610_n$) on UPSD 603, through interconnect housing 602, to solder pads $614_1$-$614_n$ (also referred to as interconnect pads $614_1$-$614_n$) on CCD 601. In accordance with one or more embodiments, the width of pressure sensor button 600 may be: (a) 10 mm or less; or (b) 15 mm, 19 mm, and so forth, to provide a universal form factor for industry standard pressure sensor packages. Further, the height of pressure sensor button 600 may be less than about 6.35 mm. To assemble pressure sensor button 600: (a) solder pins $604_1$-$604_n$ are soldered to solder pads $610_1$-$610_n$ on UPSD 603; (b) CCD 601, interconnect housing 602 and UPSD 603 are pressed together and secured to each other (as described below); and (c) solder pins $604_1$-$604_n$ are soldered to solder pads $614_1$-$614_n$ on CCD 601.

Figure 3:
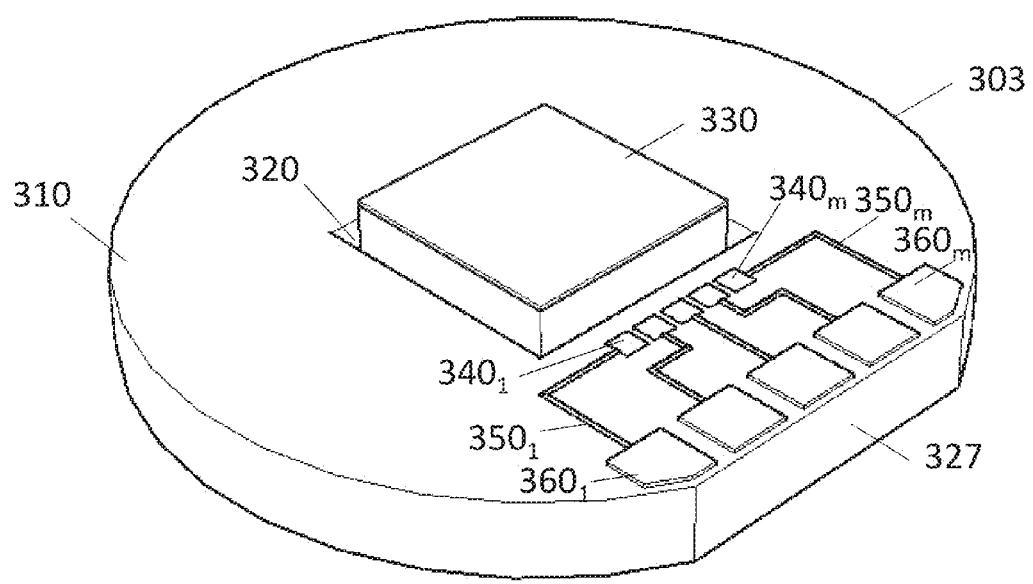
FIG. 3 is a top, perspective view of a UPSD ("Universal Pressure Sensing Disc") for a pressure sensor package that is fabricated in accordance with one or more embodiments, wherein the UPSD has a cavity disposed in a surface thereof in which a MEMS ("Micro-Electro-Mechanical Systems") pressure sensor die is attached.

FIG. 3 is a top, perspective view of UPSD 303 ("Universal Pressure Sensing Disc" 303) that is fabricated in accordance with one or more embodiments. UPSD 303 may be fabricated from a plastic, polyamide, a glass, a ceramic, a metal, or any other suitable material using any one of a number of methods that are well known to those of ordinary skill in the art.

In accordance with one or more such embodiments, UPSD 303 includes one or more pressure sensing devices. Further, such one or more pressure sensing devices may be MEMS ("Micro-Electro-Mechanical Systems") pressure sensor dies which are well known to those of ordinary skill in the art, and which MEMS pressure sensor dies typically utilize a silicon wafer. Still further, the pressure sensor dies typically include electrical connectors (not shown) which are connected to pressure sensor bonding pads disposed on UPSD 303.

As shown in FIG. 3, cavity 320 is disposed in surface 310 of UPSD 303. As further shown in FIG. 3, MEMS sensor die 330 is attached to UPSD 303 in cavity 320 (note that further embodiments exist where cavity 320 is not used and MEMS sensor 330 is attached to surface 310 of UPSD 303). MEMS sensor die 330 may be attached to UPSD 303 using any one of a number of methods that are well known to those of ordinary skill in the art such as, for example and without limitation, using an adhesive (for example and without limitation, glue or epoxy), or a seal (for example and without limitation, solder, eutectic, and so forth). In accordance with one or more such embodiments, MEMS sensor die 330 may be attached to UPSD 303 using a stress isolating adhesive, such as, for example and without limitation, a silicone, room temperature vulcanizing ("RTV") adhesive. In addition, in accordance with one or more embodiments, MEMS sensor die 330 may be encapsulated using any one of a number of methods that are well known to those of ordinary skill in the art such as, for example and without limitation, using glue or epoxy. In accordance with one or more embodiments, cavity 320 helps reduce the overall height of pressure sensor package 300 or 600 or 900. Cavity 320 may be formed using any one of a number of methods that are well known to those of ordinary skill in the art such as, for example and without limitation, etching processes.

In accordance with one or more embodiments, MEMS sensor die 330 includes electrical connectors (not shown) that are connected to pressure sensor bonding pads $340_1$-$340_m$ on UPSD 303 (refer to FIG. 3). As further shown in FIG. 3, pressure sensor bonding pads $340_1$-$340_m$ are connected by wires $350_1$-$350_m$ to interconnect pads $360_1$-$360_m$. In accordance with one or more such embodiments, interconnect pads $360_1$-$360_m$ are positioned so that they may be connected to interconnection mechanisms (as described above, these include pogo pins, solder pins and reflown solder). The connections between the electrical connectors of MEMS sensor die 330 and pressure sensor bonding pads $340_1$-$340_m$, and thereby, to optional further circuitry on UPSD 303, may be made using a wire bonding process or any one of a number of other suitable processes which are well known to those of ordinary skill in the art. In accordance with one or more further such embodiments, UPSD 303 may contain other circuitry such as, for example and without limitation, trim circuitry, signal conditioning circuitry for conditioning the output of MEMS sensor die 330 (including, for example and without limitation, one or more ASIC ("Application-Specific Integrated Circuit") dies (which may be attached to the surface of UPSD 303 or attached in further cavities in the surface of UPSD 303), and so forth. Such other circuitry, pressure sensor bonding pads and interconnect pads may be formed on UPSD 303 using any one of a number of fabrication processes that are well known to those of ordinary skill in the art, including, for example and without limitation, printing processes that are well known to those of ordinary skill in the art.

Although UPSD 303 is shown to be in the shape of a circular disc, further embodiments exist where UPSD 303 has a planar shape (for example and without limitation, a planar shape that is chosen from a number of planar shapes) that is suitable for use in a particular application. As such, UPSD 303 may be in the planar shape of a polygon such as, for example and without limitation, a square or a rectangle. As such, UPSD 303 may also be referred to herein as a planar pressure sensor support. A typical thickness of UPSD 303 is about 1 mm or less. Flat section 327 in UPSD 303 can act as an alignment feature which may be used as a reference when assembling the pressure sensor package.

Figure 4:
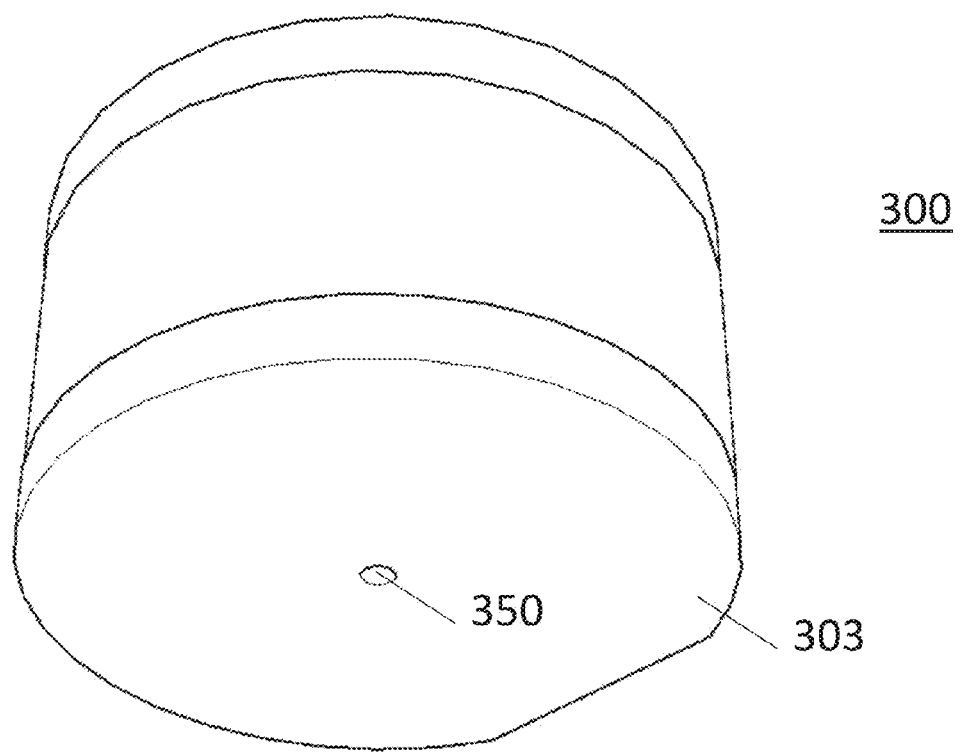
FIG. 4 is a bottom, perspective view of a pressure sensor button that is fabricated in accordance with one or more embodiments.

In accordance with one or more embodiments, UPSD 303 includes one or more pressure ports that provide access therethrough so that a medium such as a gas or a liquid may be in fluid communication with (i.e., enter and apply pressure to) one or more pressure sensing devices attached to UPSD 303. FIG. 4 is a bottom, perspective view of assembled pressure sensor button 300. As shown in FIG. 4, in accordance with one or more embodiments, pressure port 350 is disposed in and through UPSD 303. In accordance with one or more such embodiments, a pressure port (extending through UPSD 303) may have a circular aperture or it may have a shape (chosen from a wide variety of shapes) that is suitable for a particular one of a number of applications. It should also be understood that further embodiments exist where tubes and/or other types of conduits are affixed to pressure ports of a UPSD or a CCD.

Figure 5:
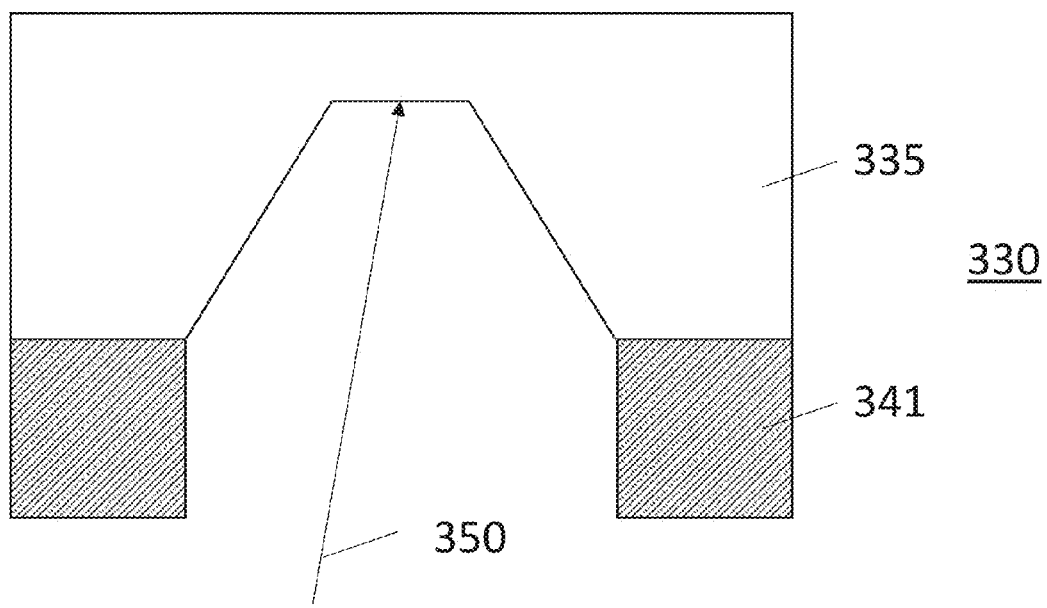
FIG. 5 is a cross-sectional view of a MEMS sensor that is fabricated in accordance with one or more embodiments showing how pressure is applied thereto in accordance with one or more embodiments.
Figure 6:
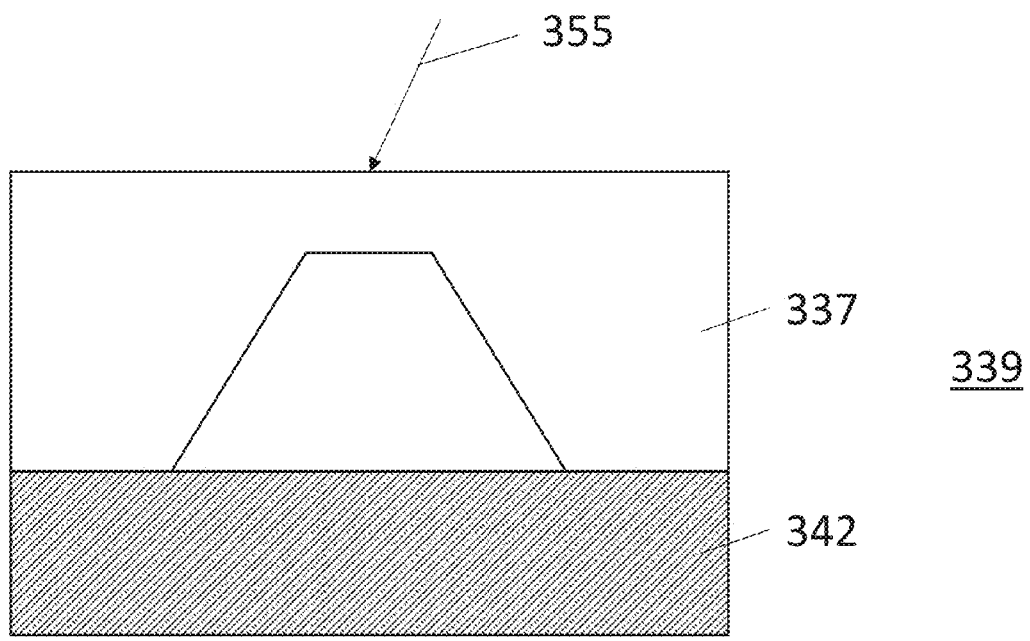
FIG. 6 is a cross-sectional view of a MEMS sensor that is fabricated in accordance with one or more further embodiments showing how pressure is applied thereto in accordance with one or more further embodiments.
Figure 7:
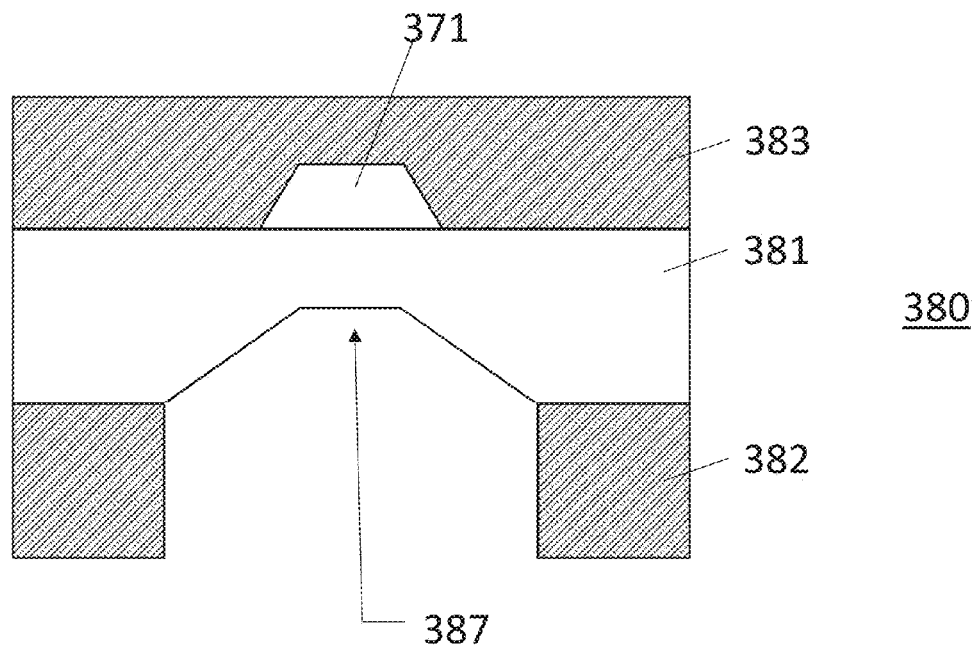
FIG. 7 is a cross-sectional view of a MEMS sensor that is fabricated in accordance with one or more still further embodiments showing how pressure is applied thereto in accordance with one or more still further embodiments.

In accordance with one or more such embodiments, a pressure sensing device such as MEMS sensor die 330 is attached to UPSD 303 in cavity 320 (or to surface 310) so that a desired face thereof (front or back) is exposed to a pressure port of UPSD 303. FIG. 5 is a cross-sectional view of MEMS sensor 330 that is fabricated in accordance with one or more embodiments showing how pressure is applied thereto in accordance with one or more embodiments. As shown in FIG. 5, MEMS sensor 330 includes silicon wafer 335 which is affixed to substrate 341 (substrate 341 may be a glass substrate, and substrate 341 may be UPSD 303 itself). In accordance with one or more embodiments, MEMS sensor 330 is affixed to UPSD 303 so that pressure (indicated by arrow 350) is applied through a pressure port in UPSD 303. In accordance with one or more such embodiments, a pressure vent may be disposed in and through CCD 301 (discussed below). FIG. 6 is a cross-sectional view of MEMS sensor 339 that is fabricated in accordance with one or more further embodiments showing how pressure is applied thereto in accordance with one or more further embodiments. As shown in FIG. 6, MEMS sensor 339 includes silicon wafer 337 which is affixed to substrate 342 (substrate 342 may be a glass substrate, and substrate 342 may be UPSD 303 itself). In accordance with one or more embodiments, MEMS sensor 330 is affixed to UPSD 303 so that pressure (indicated by arrow 355) is applied through a pressure port disposed in and through CCD 301 (discussed below). Note that if UPSD 303 has a pressure port (due to efficiencies of manufacturing a smaller number of pieces), such a port is covered by substrate 342. FIG. 7 is a cross-sectional view of a MEMS sensor 380 that is fabricated in accordance with one or more still further embodiments showing how pressure is applied thereto in accordance with one or more still further embodiments. As shown in FIG. 7, MEMS sensor 380 which is commercially available includes silicon wafer 381 which is affixed to substrate 382 (substrate 382 may be a glass substrate, and substrate 382 may be UPSD 303 itself). As further shown in FIG. 7, cover 383 (for example, cover 383 may be fabricated from a glass substrate) is affixed to wafer 381 and cover 383 includes cavity 371 which provides a vacuum. In accordance with one or more embodiments, MEMS sensor 380 is affixed to UPSD 303 so that pressure (indicated by arrow 387) is applied through a pressure port in UPSD 303. In accordance with one or more such embodiments, the pressure measured is an absolute pressure with respect to the back side pressure of cavity 371 (i.e., a vacuum). In such an embodiment, a pressure vent need not be disposed in and through CCD 301 since cover 383 encapsulates the front surface of silicon wafer 381. In accordance with one or more further embodiments wherein pressure sensor button 300, for example and without limitation, is a differential pressure sensor, two MEMS sensor dies might be attached to UPSD 303 where a front surface of a first MEMS sensor is exposed to a first pressure port and a back surface of a second MEMS sensor is exposed to a second pressure port.

In accordance with one or more embodiments, the surface area of UPSD 303 may be made big enough to accommodate pressure sensing devices suitable for use in different pressure ranges wherein the backside of UPSD 303 can accommodate the one or more pressure ports that enable exposure of the pressure sensing devices to media whose pressure is to be determined or compared. In addition, in accordance with one or more embodiments, the pressure sensor bonding pads and the interconnect pads may be rearranged to be suitable for use with different pressure sensor die configurations.

Figure 8:
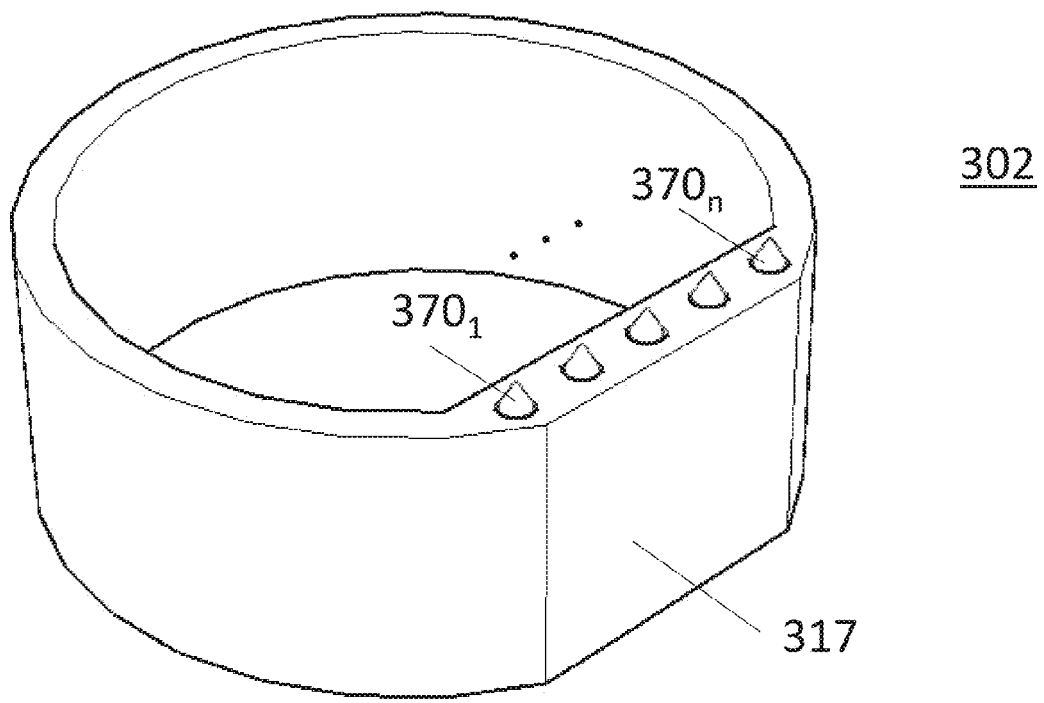
FIG. 8 is a top, perspective view of an interconnect housing for a pressure sensor package that is fabricated in accordance with one or more embodiments wherein pogo pins disposed in the interconnect housing provide electrical connections between a UPSD and a CCD.

FIG. 8 is a top, perspective view of interconnect housing 302 for pressure sensor package 300 that is fabricated in accordance with one or more embodiments. In accordance with one or more embodiments, interconnect housing 302 includes through-holes in a wall thereof that house connectors (also referred to as connection mechanisms) that provide electrical connections between UPSD 303 and CCD 301. In accordance with one or more such embodiments, connectors housed in the through-holes may be, for example and without limitation, pogo pins; solder pins; solder; conductive epoxy which fills the through holes; plating traces; conductive, thick-film printing materials from a feed-thru, thick-film printing process; and so forth. Although interconnect housing 302 is shown to be in an annular or tubular shape having a cross section in the shape of a circle, further embodiments exist where interconnect housing 302 has an annular or tubular shape (for example and without limitation, an annular or tubular shape that is chosen from a number of annular or tubular shapes) that is suitable for a particular application. As such, interconnect housing 302 may have an annular or tubular shape with a cross section in the shape of a polygon such as, for example and without limitation, a square or a rectangle. As such, interconnect housing 302 may also be referred to herein as an annular or a tubular interconnect housing. Interconnect housing 302 may be fabricated from a plastic, polyamide, a glass, a ceramic, a metal, or any other suitable material using any one of a number of methods that are well known to those of ordinary skill in the art. The through-holes can be fabricated using any one of a number of processes that are well known to those of ordinary skill in the art such as, for example and without limitation, dry press processes, etching processes, laser drilling processes, and so forth. Flat section 317 in interconnect housing 302 can act as an alignment feature which can be used as a reference in assembling the pressure sensor package.

Figure 9:
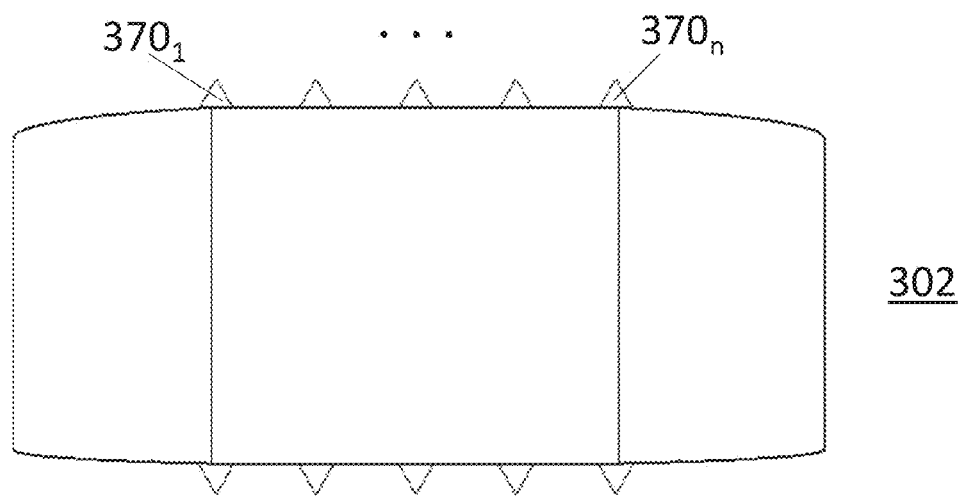
FIG. 9 is side view of the interconnect housing having pogo pins disposed therein shown in FIG. 8.

In accordance with one or more embodiments, pogo pins $370_1$-$370_m$ are disposed in through-holes in interconnect housing 302 to provide electrical connections between UPSD 301 and CCD 303—as such, when pressure sensor button 300 is assembled, pogo pins $370_1$-$370_m$ are aligned to contact interconnect pads $360_1$-$360_m$ of UPSD 303. In accordance with one or more such embodiments, pogo pins $370_1$-$370_m$ may be spring-loaded on either end or both ends thereof. Suitable pogo pins may be obtained commercially from any one of a number of manufacturers that are well known to those of ordinary skill in the art (most of whom are readily accessible through their websites). FIG. 9 is side view of interconnect housing 302 shown in FIG. 8 having pogo pins $370_1$-$370_m$ disposed in through-holes therein.

In accordance with one or more embodiments, the height of interconnect housing 302 is determined from a desired height of pressure sensor button 300, for example and without limitation, a height less than about 6.35 mm minus the heights of UPSD 303 and CCD 301, also taking into account the height of the pressure sensor die or dies attached to UPSD 303 and the height of any ASIC dies attached to CCD 301.

Figure 10:
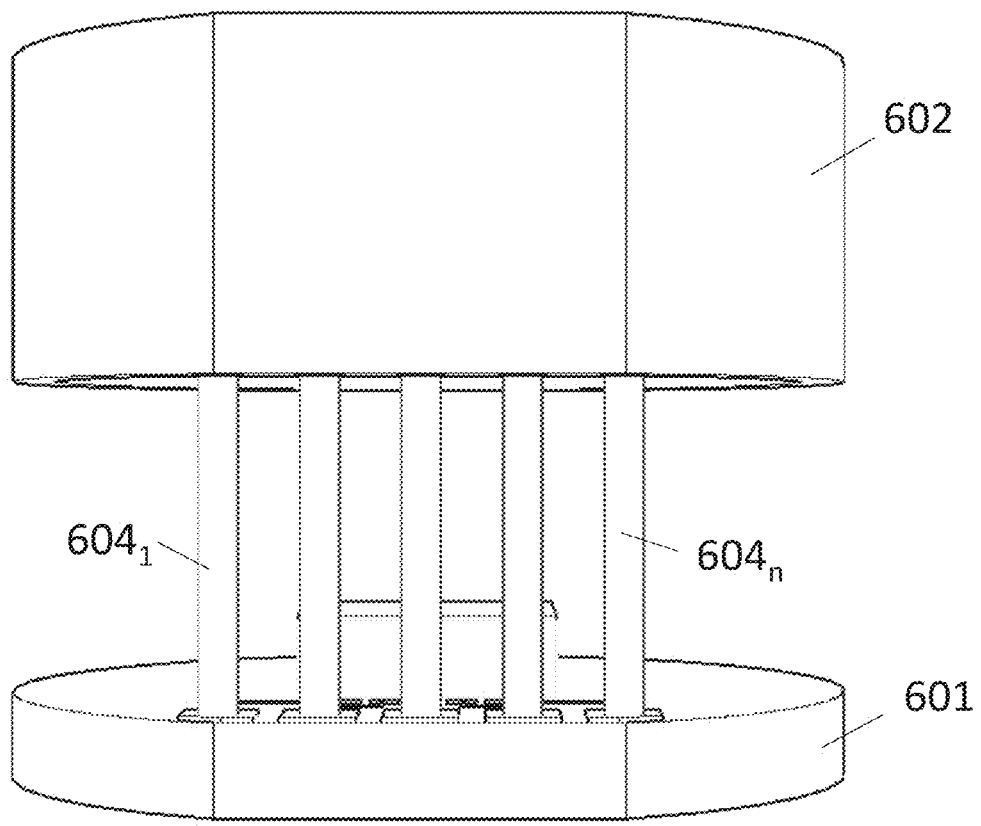
FIG. 10 is a exploded, side view of an interconnect housing and a UPSD wherein solder pins disposed in the interconnect housing provide electrical connections between the UPSD and a CCD.

FIG. 10 is a exploded, side view of interconnect housing 602 and UPSD 603 wherein solder pins $604_1$-$604_m$ disposed in through-holes in interconnect housing 602 provide electrical connections between UPSD 603 and CCD 601. In accordance with one or more such embodiments, as described above, solder pins $604_1$-$604_n$ may be soldered to solder pads $610_1$-$610_n$ (also referred to as interconnect pads $610_1$-$610_n$) on UPSD 603, and to solder pads $614_1$-$614_n$ (also referred to as interconnect pads $614_1$-$614_n$) disposed on or at a top surface of CCD 601 (refer to FIG. 2). Solder pins $604_1$-$604_m$ may be soldered to using any one of a number of methods that are well known to those of ordinary skill in the art.

Figure 9A:
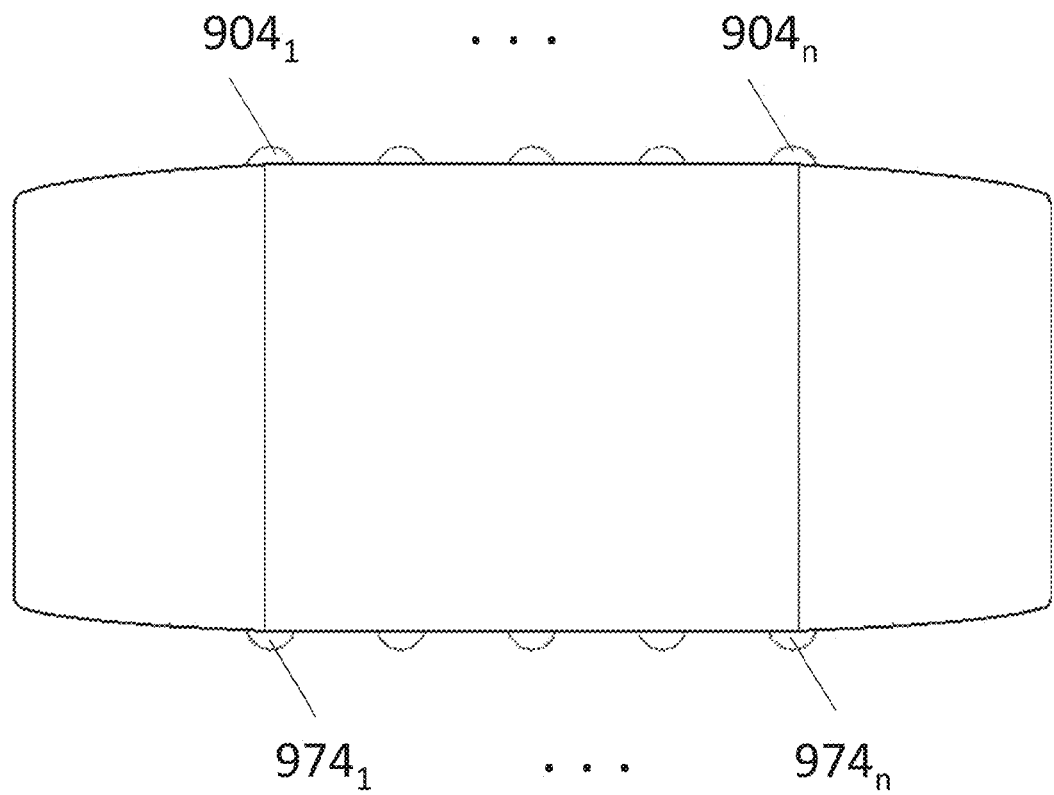
FIG. 9A is side view of an interconnect housing with solder bumps.

In accordance with one or more embodiments, through-holes in interconnect housing 902 are filled with, for example and without limitation, solder paste in accordance with any one of a number of methods that are well known to those of ordinary skill in the art, and solder bumps $904_1$-$904_n$ and $974_1$-$974_n$ are installed as shown in FIG. 9A in accordance with any one of a number of methods that are well known to those of ordinary skill in the art.

Figure 11:
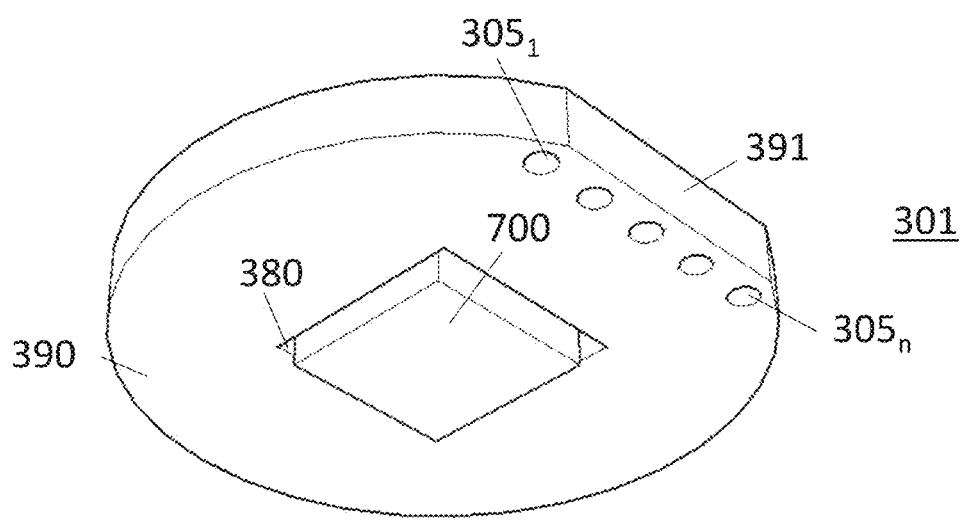
FIG. 11 is a bottom, perspective view of a CCD ("Customer-Specific Compensation Disc") for a pressure sensor package that is fabricated in accordance with one or more embodiments wherein the CCD has a cavity disposed in a surface thereof in which an ASIC ("Application-Specific Integrated Circuit") die may be attached.
Figure 12:
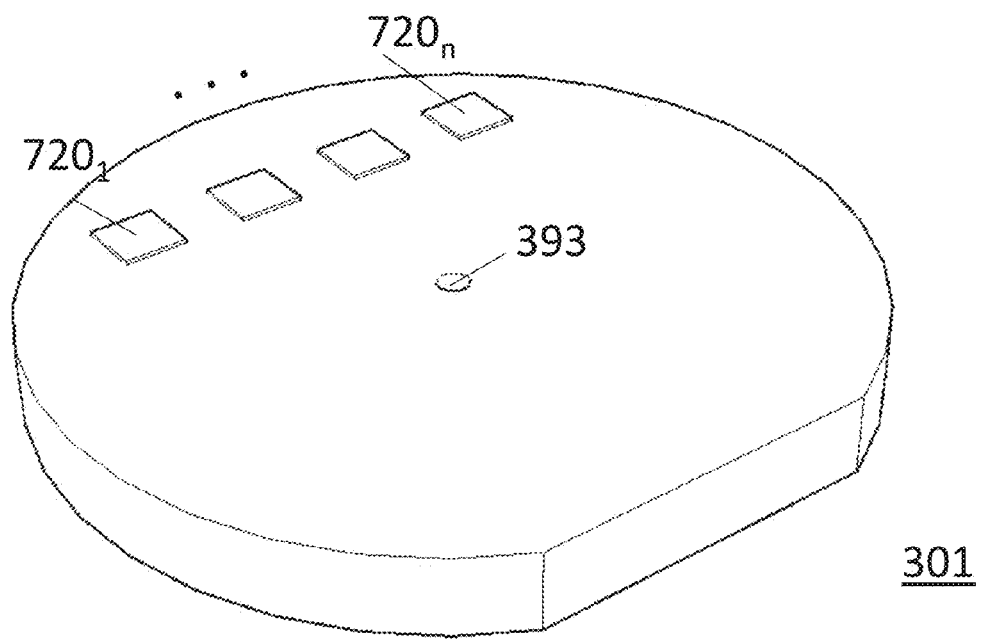
FIG. 12 is a top, perspective view of a CCD that is fabricated in accordance with one or more embodiments.

FIG. 11 is a bottom, perspective view of CCD 301 ("Customer-Specific Compensation Disc" 301) for pressure sensor package 300 that is fabricated in accordance with one or more embodiments, and FIG. 12 is a top, perspective view of CCD 301. CCD 301 may be fabricated from a plastic, polyamide, a glass, a ceramic, a metal, or any other suitable material using any one of a number of methods that are well known to those of ordinary skill in the art.

In accordance with one or more such embodiments, CCD 301 may include one or more ASICs ("Application-Specific Integrated Circuits") and, optionally, further circuitry (for example and without limitation, thick-film printed circuitry), to provide a temperature and output compensated pressure sensor in accordance with a customer's specification—where, for example and without limitation, the pressure sensor output may be in millivolts, volts, or milliamperes (the ASIC(s) and other circuitry may be referred to as compensation circuitry). Suitable ASICs and/or other suitable compensation circuitry are known to those of ordinary skill in the art. As shown in FIG. 11, cavity 380 is disposed in surface 390 of CCD 301. As further shown in FIG. 11, ASIC 700 is attached to CCD 301 in cavity 380 (note that further embodiments exist where cavity 380 is not used and ASIC 700 is attached to surface 390 of CCD 301). ASIC 700 may be attached to CCD 301 using any one of a number of methods that are well known to those of ordinary skill in the art such as, for example and without limitation, using an adhesive (for example and without limitation, glue or epoxy), or a seal (for example and without limitation, solder, eutectic, and so forth). In accordance with one or more such embodiments, ASIC 700 may be attached to CCD 301 using a stress isolating adhesive, such as, for example and without limitation, a silicone, room temperature vulcanizing ("RTV") adhesive. In addition, in accordance with one or more embodiments, ASIC 700 may be encapsulated using any one of a number of methods that are well known to those of ordinary skill in the art such as, for example and without limitation, using glue or epoxy. In accordance with one or more such embodiments, cavity 380 helps reduce the overall height of pressure sensor package 300. Cavity 380 may be formed using any one of a number of methods that are well known to those of ordinary skill in the art such as, for example and without limitation, etching processes.

In accordance with one or more such embodiments, CCD 301 includes interconnect pads $305_1$-$305_m$ which are disposed on or at a bottom surface of CCD 301 and which are positioned so they are aligned with the interconnection mechanisms in the through-holes of interconnect housing 302. In accordance with one or more further embodiments, interconnect pads $305_1$-$305_m$ may be disposed in cavities in CCD 301 which are positioned so they are aligned with the interconnection mechanisms in the through-holes of interconnect housing 302. Further, in accordance with one or more such embodiments, CCD 301 includes pressure sensor button connection pads $720_1$-$720_n$ disposed on, or at, a top surface of CCD 301 (refer to FIG. 12). Pressure sensor button connection pads $720_1$-$720_n$ are used to connect: (a) output from pressure sensor button 300 to any further system, circuit or device; and (b) input to pressure sensor button 300 from any further system, circuit or device (for example and without limitation, voltage supply input to MEMS sensor die 330).

Although CCD 301 is shown to be in the shape of a circular disc, further embodiments exist where CCD 301 has a planar shape (for example and without limitation, a planar shape that is chosen from a number of planar shapes) that is suitable for a particular application. As such, CCD 301 may be in the planar shape of a polygon such as, for example and without limitation, a square or a rectangle. As such, CCD 301 may also be referred to herein as a planar compensation support. A typical thickness of CCD 301 is about 1 mm or less. Flat section 391 in CCD 301 can act as an alignment feature which may be used as a reference when assembling pressure sensor package 300.

In accordance with one or more embodiments, ASIC die 700 includes electrical connectors (not shown) that are connected to circuitry on CCD 301. In particular, in accordance with one or more such embodiments, the electrical connectors of ASIC die 700 are connected to interconnect pads $305_1$-$305_n$ shown in FIG. 11. The connections between the electrical connectors of ASIC die 700 and interconnect pads $305_1$-$305_n$ may be made using a wire bonding process or any one of a number of other suitable processes which are well known to those of ordinary skill in the art.

In accordance with one or more embodiments, interconnect pads $305_1$-$305_m$ are electrically connected to any ASIC, for example, ASIC 700, or other circuitry (for example pressure sensor compensation circuitry) disposed on CCD 301. Further, in accordance with one or more such embodiments: (a) output from any ASIC or other circuitry is electrically connected to pressure sensor button connection pads $720_1$-$720_m$ disposed on, or at, a top surface of CCD 301 (refer to FIG. 1); and (b) input to pressure sensor button 300 (for example, input to MEMS sensor die 330 is electrically connected from one or more of sensor button connection pads $720_1$-$720_n$ to interconnect pads $305_1$-$305_m$. Such electrical connections can be made by through-hole electrical connections through CCD 301. In accordance with one or more embodiments, the interconnection mechanisms in interconnect housing 302 may electrically connect UPSD 303 directly to pressure sensor button connection pads $720_1$-$720_m$ disposed on, or at, a top surface of CCD 301, for example and without limitation, where CCD 301 contains no ASIC or other circuitry.

In accordance with one or more embodiments, CCD 301 includes one or more pressure ports and/or pressure vents (discussed above) (see port/vent 393 in FIG. 12) that provide access therethrough so that, for example, a medium such as a gas or a liquid may be in fluid communication with (i.e., enter and apply pressure to one or more pressure sensing devices attached to UPSD 303 or a medium such as a gas or fluid may be vented as pressure is applied to a pressure sensor device attached to UPSD 303). In accordance with one or more such embodiments, a pressure sensing device such as MEMS sensor die 330 is attached to UPSD 303 in cavity 320 so that a desired face thereof (front or back) is exposed to a pressure port of CCD 301. In accordance with one or more embodiments of pressure sensor button 300, a pressure sensing device attached to UPSD 303 may be exposed to pressure from a first medium applied to a pressure port in UPSD 303 and to pressure from a second medium applied to a pressure port in CCD 301. In accordance with one or more such embodiments, a pressure port or vent (extending through CCD 301) may have a circular aperture or it may have a shape (chosen from a wide variety of shapes) that is suitable for a particular one of a number of applications. It should also be understood that further embodiments exist where tubes and/or other types of conduits are affixed to the pressure ports.

In accordance with one or more embodiments, pressure sensor button connection pads $720_1$-$720_m$ may be configured for three (3) pads or four (4) pads for connection to other systems or devices using, for example and without limitation, soldered wires, pogo-pins, soldered flex wires, and so forth. In particular, in accordance with one or more such embodiments, the pressure sensor button may be configured with three (3) pressure sensor button connection pads consisting of one for V+ (i.e., a positive supply voltage), one for V− (i.e., a negative supply voltage), and one for PSO (i.e., a pressure sensor output). Further, in accordance with one or more further such embodiments, the pressure sensor button may be configured with four (4) pressure sensor button connection pads consisting of one for V+ (i.e., a positive supply voltage), one for V− (i.e., a negative supply voltage), one for PSO (i.e., a pressure sensor output), and one for T (i.e., a temperature output of the pressure sensor).

It should be clear to those of ordinary skill in the art that the description above relating to UPSD 303 applies as well to UPSD 603 and 903. It should also be clear to those of ordinary skill in the art that the description above relating to CCD 301 applies as well to CCD 901. CCD 601 differs from CCD 301 and 901 in that, while CCD 301 includes interconnect pads $305_1$-$305_m$ which are disposed on or at a bottom surface of CCD 301 and which are positioned so they are aligned with the interconnection mechanisms in the through-holes of interconnect housing 302, CCD 601 includes solder pads $614_1$-$614_n$ which are disposed on or at a top surface of CCD 601, which include apertures so that solder pins can extend therein or therethrough, and which are positioned so they are aligned with the interconnection mechanisms (for example, solder pins) in the through-holes of interconnect housing 602. As such, during assembly of pressure sensor button 600, after solder pins $604_1$-$604_n$ are soldered to solder pads $610_1$-$610_n$ on UPSD 603, and interconnect housing 602 is attached to UPSD 603 and CCD 601, solder pins $604_1$-$604_n$ are soldered to solder pads $614_1$-$614_n$ on CCD 601.

In fabricating pressure sensor button 300, UPSD 303, interconnect housing 302 and CCD 301 are affixed to each other using any one of a number of methods that are well known to those of ordinary skill in the art such as, for example and without limitation, by gluing, by using epoxy materials, by soldering (depending on the materials comprising the components), and so forth (while aligning the parts using flat sections at 317, 327 and 391 described above where such flat sections have been provided). In fabricating pressure sensor button 600, UPSD 603, interconnect housing 602 and CCD 601 are affixed to each other using any one of a number of methods that are well known to those of ordinary skill in the art such as, for example and without limitation, by gluing, by using epoxy materials, by soldering (depending on the materials comprising the components), and so forth (while aligning the parts using any alignment mechanisms that have been provided). In fabricating pressure sensor button 600, UPSD 603, interconnect housing 602 and CCD 601 are affixed to each other using any one of a number of methods that are well known to those of ordinary skill in the art such as, for example and without limitation, by gluing, by using epoxy materials, by soldering (depending on the materials comprising the components), and so forth (while aligning the parts using any alignment mechanisms that have been provided).

Figure 13:
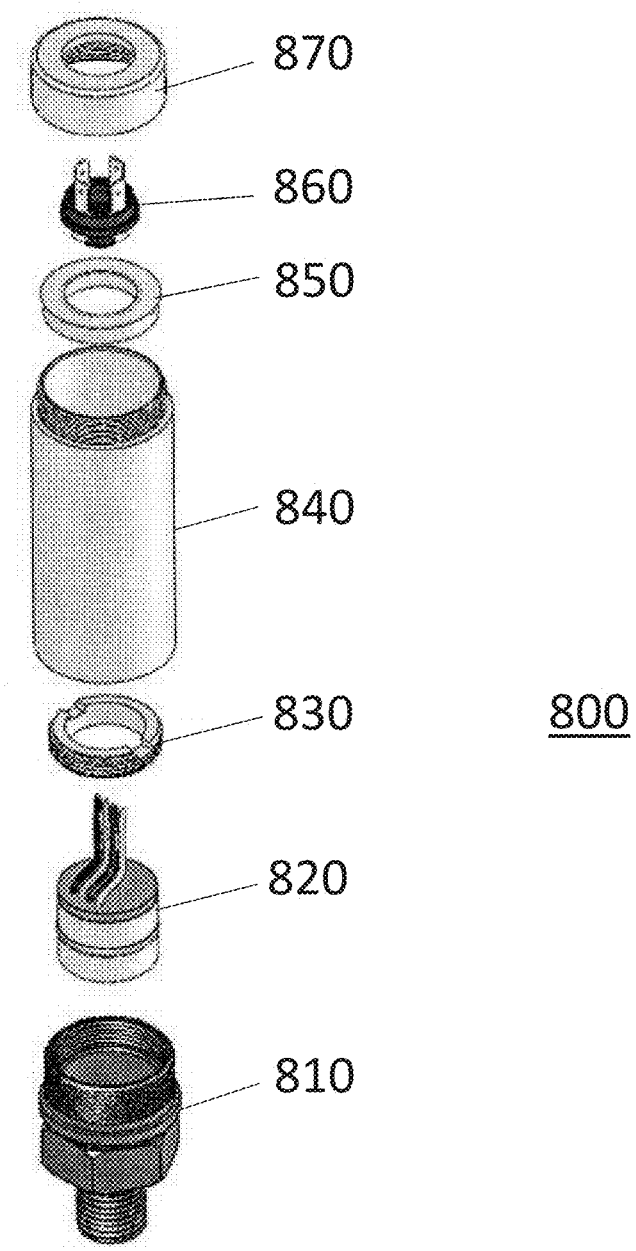
FIG. 13 is an exploded view of a pressure sensor that incorporates a pressure sensor button that is fabricated in accordance with one or more embodiments.
Figure 14:
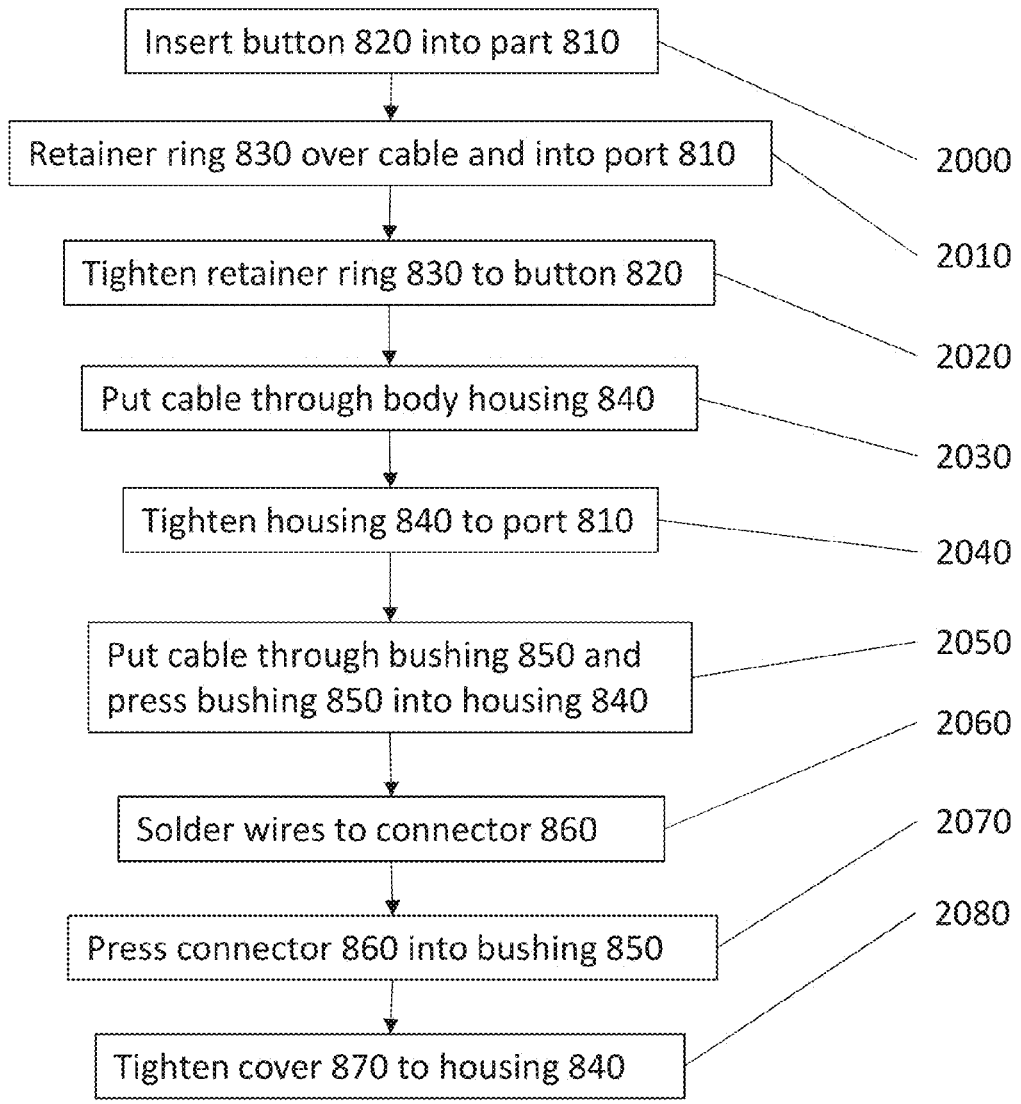
FIG. 14 is a flowchart of assembly flow for a pressure sensor that incorporates a pressure sensor button that is fabricated in accordance with one or more embodiments.

FIG. 13 is an exploded view of pressure sensor 800 that incorporates pressure sensor button 820 that is fabricated in accordance with one or more embodiments. FIG. 13 helps illustrate an assembly flow for pressure sensor 800 shown in FIG. 14. First, step 2000, insert pressure sensor button 820 module into a cavity of pressure port 810, and firmly press it down all the way into the cavity (pressure port 810 may include on O-ring upon which pressure sensor button 820 sits, or pressure sensor button 820 may be glued to pressure port 810). Next, optionally, an O-ring may be placed on top of pressure sensor button 820. Next, step 2010, place retainer ring 830 over the cable of pressure sensor button 820 and into the cavity of pressure port 810. Next, step 2020, screw-tighten retainer ring 830 until it fully touches the pressure sensor button 820, or optional O-ring. Next, step 2030, put the cable through body housing 840. Next, step 2040, screw-tighten body housing 840 to pressure port 810 until it cannot go any further. Next, step 2050, put the cable through plastic bushing 850, and hand press plastic bushing 850 into the open end of body housing 840. Next, step 2060, solder wires to tabs of DIN 9.4 connector 860. Next, step 2070, press DIN connector 860 into plastic bushing 850. Next, step 2080, screw-tighten top cover 870 to body housing 840.

Embodiments described above are exemplary. For example, numerous specific details are set forth such as parts, dimensions, temperature ranges, materials, mechanical design, etc. to provide a thorough understanding of the present invention. However, as one having ordinary skill in the art would recognize, the present invention can be practiced without resorting to the details specifically set forth. As such, many changes and modifications may be made to the description set forth above by those of ordinary skill in the art (i.e., various refinements and substitutions of the various embodiments are possible based on the principles and teachings herein) while remaining within the scope of the invention. In addition, materials, methods, and mechanisms suitable for fabricating embodiments have been described above by providing specific, non-limiting examples and/or by relying on the knowledge of one of ordinary skill in the art. Materials, methods, and mechanisms suitable for fabricating various embodiments or portions of various embodiments described above have not been repeated, for sake of brevity, wherever it should be well understood by those of ordinary skill in the art that the various embodiments or portions of the various embodiments could be fabricated utilizing the same or similar previously described materials, methods or mechanisms. As such, the scope of the invention should be determined with reference to the appended claims along with their full scope of equivalents.

What is claimed is:

1. A pressure sensor package comprising:
a pressure sensor support attached to an interconnect housing which is attached to a compensation support; wherein:
a pressure sensor device is attached to the pressure sensor support and is electrically connected to pads disposed on the pressure sensor support;
compensation circuitry is attached to the compensation support and is electrically connected to pads disposed on the compensation support;
connectors disposed in through holes in a wall of the interconnect housing are electrically connected to the pads on the pressure sensor support and to the pads on the compensation support; and
a pressure port disposed in the pressure sensor package and extending through the pressure sensor package from an exterior to the pressure sensing device in an interior.

2. The pressure sensor package of claim 1 wherein the pressure port is disposed in the pressure sensor support.

3. The pressure sensor package of claim 1 wherein the pressure sensor support includes a cavity and the pressure sensor device is disposed in the cavity.

4. The pressure sensor package of claim 1 wherein the compensation support includes a cavity and at least a portion of the compensation circuitry is disposed in the cavity.

5. The pressure sensor package of claim 1 wherein the pressure sensor device comprises a MEMS sensor die.

6. The pressure sensor package of claim 1 wherein the compensation circuitry comprises an ASIC.

7. The pressure sensor package of claim 1 wherein the connectors are pogo pins.

8. The pressure sensor package of claim 1 wherein the connectors are solder pins.

9. The pressure package of claim 1 wherein the connectors are comprised of solder.

10. The pressure package of claim 1 wherein the pressure sensor support is planar.

11. The pressure package of claim 10 wherein the interconnect housing is annular.

12. The pressure package of claim 11 wherein the compensation support is planar.

13. The pressure package of claim 12 wherein the pressure sensor support, the interconnect housing and the compensation support each includes an alignment feature.

14. The pressure package of claim 13 wherein the pressure sensor device comprises a MEMS sensor device.

15. A pressure sensor package comprising:
a planar pressure sensor support with a top surface and a bottom surface and a first plurality of electrical interconnect pads on a periphery of the top surface;
a pressure sensing device coupled to the planar pressure sensor support and electrically connected to the first plurality of electrical interconnect pads;
a planar compensation support with a first top surface and a first bottom surface and a second plurality of electrical interconnect pads on a periphery of the first bottom surface;
compensation electronics disposed on the planar compensation support and in electrical communication with the second plurality of electrical interconnect pads;
an interconnect housing with a second top surface and a second bottom surface and a passage that runs through the interconnect housing from the top surface to the bottom surface and creates a periphery wall around the passage, wherein a plurality of holes extending through the periphery wall from the second top surface to the second bottom surface;
a plurality of electrical conductors disposed in the plurality of holes and extending from the second top surface to the second bottom surface; and
a pressure port extending through the pressure sensor package from an exterior to the pressure sensing device in an interior;
wherein, the first and second plurality of electrical interconnect pads and the plurality of holes are each arranged such that when the interconnect housing is assembled between the top surface of the planar pressure sensor support and the bottom surface of the planar compensation support, the pressure sensing device is placed in electrical communication with the compensation electronics via the plurality of electrical conductors.

16. The pressure sensor package of claim 15, wherein the pressure port is disposed in the planar pressure sensor support and extends from the top surface to the bottom surface below the pressure sensing device.

17. The pressure sensor package of claim 15, wherein the compensation circuitry comprises an ASIC.

18. The pressure package of claim 15, wherein the electrical conductors are comprised of solder.

19. A pressure sensor package comprising:
a universal pressure sensing disc with a top surface and a bottom surface and a first plurality of electrical interconnect pads on a periphery of the top surface;
a pressure sensing device coupled to the universal pressure sensing disc and electrically connected to the plurality of electrical interconnect pads;
a customer specific compensation disc with a first top surface and a first bottom surface and a second plurality of electrical interconnect pads on a periphery of the first bottom surface;
compensation electronics disposed on the customer specific compensation disc and in electrical communication with the second plurality of electrical interconnect pads;
an interconnect housing with a second top surface and a second bottom surface, the interconnect housing coupled between the top surface of the universal pressure sensing disc and the first bottom surface of the customer specific compensation disc, wherein the interconnect housing has a passage that runs through the interconnect housing from the second top surface to the second bottom surface and creates a periphery wall around the passage;
a plurality of electrically conductive paths in the periphery wall of the interconnect housing wherein the electrically conductive paths electrically connect the first and second plurality of electrical interconnect pads; and a pressure port extending through the pressure sensor package from an exterior to the pressure sensing device in an interior.

20. The pressure sensor package of claim 19, wherein the pressure port is disposed in the universal pressure sensing disc and extends from the top surface to the bottom surface below the pressure sensing device.

\* \* \* \* \*